(12) United States Patent
Iacob et al.

(10) Patent No.: US 10,152,990 B2
(45) Date of Patent: Dec. 11, 2018

(54) FLATBED CUTTER ASSEMBLY AND A METHOD THEREFOR

(71) Applicant: Océ Holding B.V., Venlo (NL)

(72) Inventors: Violeta Iacob, Timisoara (RO); Radu Vulpe, Timisoara (RO)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 15/824,779

(22) Filed: Nov. 28, 2017

(65) Prior Publication Data

US 2018/0166095 A1   Jun. 14, 2018

(30) Foreign Application Priority Data

Dec. 8, 2016   (EP) ..................................... 16202868

(51) Int. Cl.
| | |
|---|---|
| *B26F 1/38* | (2006.01) |
| *G11B 3/72* | (2006.01) |
| *G05B 15/02* | (2006.01) |
| *B26D 7/27* | (2006.01) |
| *B26D 7/20* | (2006.01) |
| *B26D 3/08* | (2006.01) |

(Continued)

(52) U.S. Cl.
CPC ................ *G11B 3/72* (2013.01); *B26D 3/085* (2013.01); *B26D 5/00* (2013.01); *B26D 7/20* (2013.01); *B26D 7/27* (2013.01); *B26F 1/38* (2013.01); *B26F 1/3813* (2013.01); *B41J 3/28* (2013.01); *B41J 3/60* (2013.01); *B41J 11/0035* (2013.01);

(Continued)

(58) Field of Classification Search
CPC ... B41J 11/663; B41J 11/0095; B41J 11/0035; B26D 5/00; B26D 7/27; B26D 3/085; B26D 7/20
See application file for complete search history.

(56) References Cited

U.S. PATENT DOCUMENTS

| | | | |
|---|---|---|---|
| 3,973,453 A * | 8/1976 | Tameo ...................... | B26F 1/18 83/30 |
| 4,467,525 A * | 8/1984 | Logan ...................... | B26D 5/02 33/18.2 |

(Continued)

OTHER PUBLICATIONS

European Search Report issued in Application No. EP 16 20 2868 dated May 19, 2017.

*Primary Examiner* — Sean Michalski
(74) *Attorney, Agent, or Firm* — Birch, Stewart, Kolasch & Birch, LLP

(57) ABSTRACT

A flatbed cutter assembly includes a medium support table for supporting a recording medium, the table extending in a first direction and a second direction, the first direction being perpendicular to the second direction, a gantry arranged to be moveable over the medium support table in the first direction, a carriage support movably arranged on the gantry to move over the medium support table in the second direction, a cutter configured to be coupled to the carriage support and a controller for controlling the movements of the gantry, the carriage support and the cutter while moving over the medium support table. The controller is configured to cut through the recording medium from the front side to the back side along a cut path except for a plurality of bridges along the cut path, the recording medium intended to be printed on both front and back side of the recording medium, wherein parts of each bridge which are intended to be adjacent to printed images on the front and back side of the recording medium, are removed by the cutter.

6 Claims, 5 Drawing Sheets

(51) Int. Cl.
  *B26D 5/00* (2006.01)
  *B41J 3/28* (2006.01)
  *B41J 3/60* (2006.01)
  *B41J 11/00* (2006.01)
  *B41J 11/66* (2006.01)
  *B41J 13/00* (2006.01)

(52) U.S. Cl.
  CPC ........ *B41J 11/0065* (2013.01); *B41J 11/0095* (2013.01); *B41J 11/663* (2013.01); *B41J 13/0063* (2013.01); *G05B 15/02* (2013.01)

(56) References Cited

U.S. PATENT DOCUMENTS

| | | | | |
|---|---|---|---|---|
| 4,524,894 A | * | 6/1985 | Leblond | B26F 1/3806 225/2 |
| 5,275,077 A | | 1/1994 | Kobayashi | |
| 5,761,982 A | * | 6/1998 | Abt | B26D 7/20 83/861 |
| 5,820,006 A | * | 10/1998 | Turner | B26F 3/002 225/96 |
| 6,463,762 B1 | * | 10/2002 | Ross, Jr. | B65G 49/061 225/2 |
| 6,565,420 B2 | * | 5/2003 | Lisec | B26F 3/008 451/102 |
| 6,768,502 B2 | * | 7/2004 | Milton | B41J 3/4075 347/197 |
| 10,016,905 B2 | * | 7/2018 | Kobayashi | B26D 3/14 |
| 2005/0147476 A1 | * | 7/2005 | Wieners | B26D 3/085 408/21 |
| 2016/0059590 A1 | * | 3/2016 | Kako | B41J 11/663 347/218 |
| 2017/0066152 A1 | * | 3/2017 | Yamamoto | B26D 5/38 |

* cited by examiner

FLATBED CUTTER ASSEMBLY AND A METHOD THEREFOR

FIELD OF THE INVENTION

The present invention generally pertains to a flatbed cutter assembly comprising a medium support table for supporting a recording medium, the table extending in a first direction and a second direction, the first direction being perpendicular to the second direction, a gantry arranged to be moveable over the medium support table in the first direction, a carriage support movably arranged on the gantry to move over the medium support table in the second direction, a cutter configured to be coupled to the carriage support and comprising an actuator to control a cutting depth, and a controller for controlling the movements of the gantry, the carriage support and the cutter while moving over the medium support table.

BACKGROUND ART

A flatbed cutter assembly is known in the art. Such a known cutter assembly comprises a medium support table on which a recording medium may be arranged. Such a cutter assembly is particular advantageous for cutting large rigid media. Such rigid media are, for example, used in the graphics arts for printing signs, banners, posters, bill boards, bear coasters, awards, etc.

A gantry is provided such that the gantry is moveable over the medium support table and a carriage is moveably supported by the gantry such that the carriage is moveable over the medium support table in a direction perpendicular to the direction of movement of the gantry. By suitably controlling a movement of the gantry and the carriage, a cutter such as a kiss cut tool or another type of cutter is enabled to cut a piece out of the rigid media which acts as a jig, according to a cut path. The cut path may be an outline of an image intended to be printed on the rigid media. The cut path may be located inside an image intended to be printed on the rigid media. A cutting depth may be specified by a tool down position with respect to a belt of the cutter.

The rigid media may be printed on by means of a printing device. When one or both sides of the rigid media comprise a printed image consisting of a marking material like ink or toner and afterwards the printed rigid media is cut by a flatbed cutter assembly, printed marking material may chip off a printed side during cutting.

By first cutting the rigid media and printing the images on both sides, this problem may be avoided, but another problem arises of aligning the front and back printed images and aligning is time consuming especially when a plurality of media pieces have to be aligned.

Also known is to cut the rigid media along a cut path using bridges in the cut path. A bridge is a part of the cut path which is not cut out but the recording medium at a location of the bridge remains intact. The use of bridges will hold front and back images together so that alignment of the front and back images is easily made.

However, by using bridges printed marking material on the printed sides of the recording medium will chip near the bridges when the piece of recording medium is extracted from the jig.

It is desirable to have a flatbed cutter assembly that is enabled and configured to cut rigid media, while making it easy to align a front and back image to be printed on the rigid media and avoiding chipping off of marking material once printed on the rigid media.

SUMMARY OF THE INVENTION

In an aspect of the present invention, a flatbed cutter assembly is provided with the controller configured to
a) instruct the cutter to cut through the recording medium from a front side to a back side along a cut path except for a plurality of locations of bridges along the cut path,
b) instruct the cutter to cut the recording medium for less than half the thickness of the recording medium from the front side towards the back side at the locations of the bridges along the cut path,
c) receive a trigger that the recording medium is removed from the medium support table as to be turned upside down,
d) receive a trigger that the recording medium is aligned again on the medium support table, and
e) instruct the cutter to cut the recording medium for less than half the thickness of the recording medium from the back side towards the front side at the locations of the bridges along the cut path.

Experiments have been conducted creating three examples of a cut recording medium.

In one example firstly the images are printed on both sides of the recording medium and secondly the recording medium is cut which. This one example has disadvantages as described in the paragraph of the background art.

In another example firstly the recording medium is cut with bridges and then the images are printed on both sides of the recording medium. This other example has also disadvantages as described in the paragraph of the background art.

In a third example firstly the recording medium is cut with bridges as prescribed according to the present invention and then the images are printed. This third example gives the best result out of the three examples. A bridge as prescribed according to the present invention is hereinafter also called a "partial bridge" or a "half bridge".

Cutting with partial bridges holds the printed piece of the recording medium together with the surrounding remainder of the recording medium. The surrounding remainder of the recording medium is also called a jig. This is advantageous when the recording medium is cut with the partial bridges and has to be turned upside down to print on the other side. By doing so, alignment of the printed images on both sides is assured. At the same time the printed marking material like ink or toner does not chip from the double-sided printed piece of recording medium when breaking the partial bridges. The final product is not damaged by breaking the partial bridges.

The cutter type may be an arbitrary type. However, cutting has to be done with an actuator for controlling the cutting depth of the cutter. The recording medium may be an arbitrary material, but is preferably rigid.

According to an embodiment of the flatbed cutter assembly, the controller is configured to
i) receive a print job including a cut path intended to circumvent a piece of the recording medium,
ii) determine whether or not the print job specifies that images are intended to be printed on a front side and on a back side of the recording medium,
iii) determine whether or not the print job specifies that the images are intended to be printed at least partially full bleed with respect to the cut path, iv) determine whether or not the circumvented piece of recording medium has at least two axes of symmetry, v) upon a positive determination of ii), iii) and iv), applying the steps a)-e) according to the invention.

According to an embodiment the flatbed cutter assembly comprises a user interface and the controller is configured to request permission to execute step e) by means of user interaction via the user interface. The user interface may be a local user interface or a remote user interface connected to the controller via a digital network.

The invention also relates to a method for cutting a recording medium by a flatbed cutter assembly, the flatbed cutter assembly comprising a medium support table for supporting a recording medium, the table extending in a first direction and a second direction, the first direction being perpendicular to the second direction, a gantry arranged to be moveable over the medium support table in the first direction, a carriage support movably arranged on the gantry to move over the medium support table in the second direction, a cutter configured to be coupled to the carriage support and comprising an actuator to control a cutting depth, and a controller for controlling the movements of the gantry, the carriage support and the cutter while moving over the medium support table, wherein the method comprises the steps of a) instructing the cutter to cut through the recording medium from a front side to a back side along a cut path except for a plurality of locations of bridges along the cut path, b) instructing the cutter to cut the recording medium for less than half the thickness of the recording medium from the front side towards the back side at the locations of the bridges along the cut path, c) receiving a trigger that the recording medium is removed from the medium support table as to be turned upside down, d) receiving a trigger that the recording medium is aligned again on the medium support table, and e) instructing the cutter to cut the recording medium for less than half the thickness of the recording medium from the back side towards the front side at the locations of the bridges along the cut path.

According to an embodiment the method comprises the steps of i) receiving a print job including a cut path intended to circumvent a piece of the recording medium, ii) determining whether or not the print job specifies that images are intended to be printed on a front side and on a back side of the recording medium, iii) determining whether or not the print job specifies that the images are intended to be printed at least partially full bleed with respect to the cut path, iv) determining whether or not the circumvented piece of recording medium has at least two axes of symmetry, and v) upon a positive determination of ii), iii) and iv), applying the steps a)-e) according to the method of the invention.

The invention also relates to a computer-program product configured to execute a method according to the invention when executed on a processor.

The invention also relates to a non-transitory data carrier having stored thereon the computer-program product according to the invention.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinafter and the accompanying schematic drawings which are given by way of illustration only, and thus are not limitative of the present invention, and wherein.

DETAILED DESCRIPTION OF THE DRAWINGS

Figure 1:
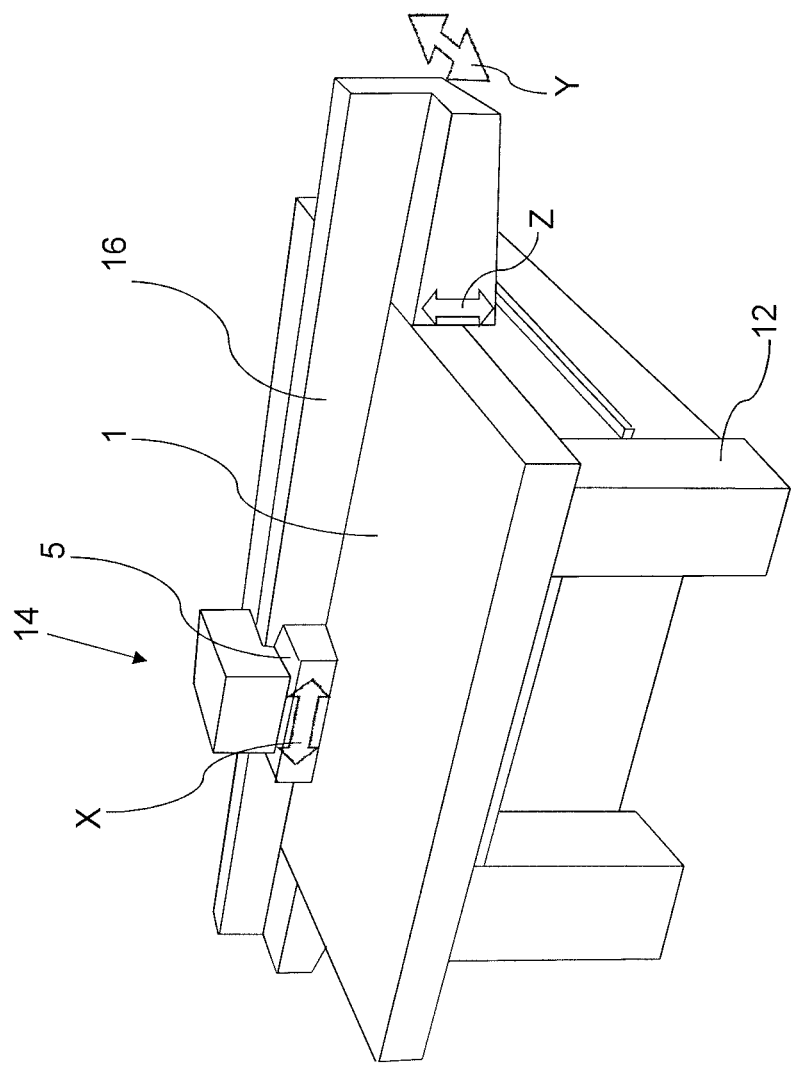
FIG. 1 is a perspective view of an embodiment of a flatbed cutter assembly.

The present invention will now be described with reference to the accompanying drawings, wherein the same reference numerals have been used to identify the same or similar elements throughout the several views.

FIG. 1 shows an embodiment of a flatbed cutter assembly 14 according to the invention, in which the medium supporting means 1 is a flat surface. On the flat surface a non-flexible flat medium may be arranged and may be cut. The medium supporting means 1 is supported on a suitable support structure 12 and a carriage guiding assembly 16 is arranged over the medium supporting means 1. Such carriage guiding assembly 16 is also known in the art as a gantry. The carriage guiding assembly supports a cutter carriage 5 such that the cutter carriage 5 is enabled to scan in an X-direction. The carriage guiding assembly 16 is arranged and configured to be enabled to reciprocate in a Y-direction, wherein the Y-direction is usually substantially perpendicular to the X-direction. In a known flatbed cutter assembly 14, the carriage guiding assembly 16 is also arranged and configured to be enabled to move in a Z-direction, which is substantially perpendicular to the X-direction and the Y-direction such to enable to adapt the flatbed cutter assembly 14 to a thickness of the recording medium being arranged on the medium supporting surface 1.

A cutter (not shown) is coupled to the cutter carriage 5 and comprises an actuator to control a cutting depth in the Z-direction towards the medium supporting means 1.

Sensors may be provided with the flatbed cutter assembly 14 to detect a presence of a recording medium on the medium supporting means 1, an alignment of a recording medium on the medium supporting means 1 and a removal of a recording medium from the medium supporting means 1.

The controller of the flatbed cutter assembly 14 may be integrated in a housing of the flatbed cutter assembly 14 or may be resident in a work station digitally connected to the flatbed cutter assembly 14. The controller may comprise hardware and/or software configured to instruct the cutter to execute cutting operations. Input for the instructions maybe a print job submitted to the controller of the flatbed cutter assembly 14. The print job may specify an image per side of the recording medium, a cut path and a print mode of full bleed printing within the cut path. Full bleed printing may also be referred to as printing from edge to edge.

The controller is configured to derive from the cut path whether or not the piece of recording medium which is intended to be circumvented by the cut path has at least two axes of symmetry. The more axes of symmetry the piece of recording medium intended to be cut out possesses, the more advantage the method of the invention is. When the piece of recording medium intended to be cut out of the recording medium has more than one axis of symmetry the operator has more trouble to align the cut out piece when no bridges are used at all. The trouble gets worse when the number of axes of symmetry increases. For example, in case of a cut path in the form of a circle a printed image on a front side of the recording medium is difficult to align before printing the image on the back side of the recording medium when no bridges are used and the piece of recording medium is loose from the jig after cutting.

The controller is configured to derive from the cut path elementary cutting instructions for the cutter.

According to an embodiment the flatbed cutter assembly 14 comprises a user interface (not shown) and the controller is configured to receive print jobs with cutting commands via the user interface. The controller may also be configured to request permission to execute a step of the method according to the invention by means of user interaction via the user interface. According to another embodiment elementary cutting instructions are provided to the controller via the user interface. The cutting instructions may be entered by an operator via the user interface.

Figure 2:
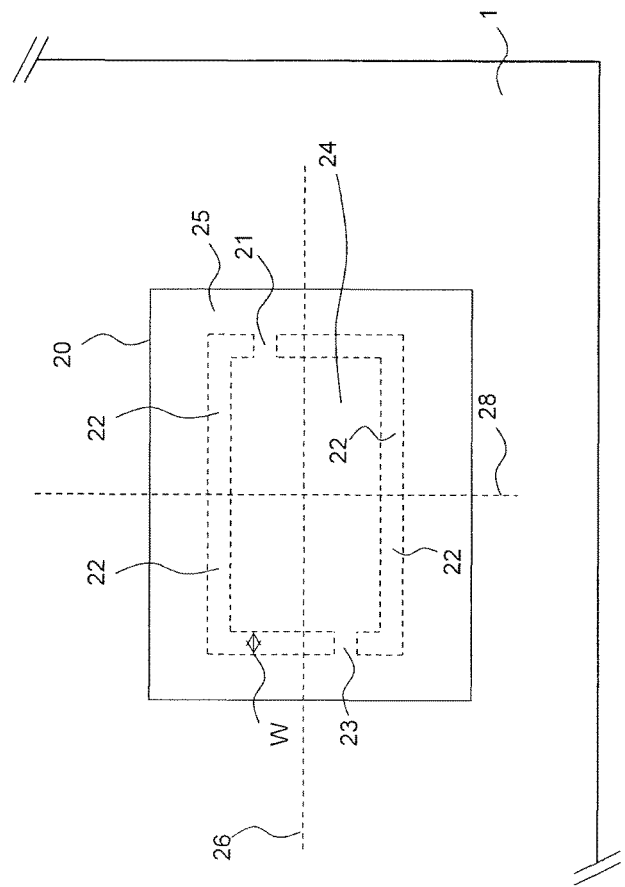
FIG. 2 is a schematic top view of a recording medium lying on the medium support table of a flatbed cutter assembly according to the invention.

FIG. 2 schematically illustrates a top view of a recording medium 20 lying on the medium supporting surface 1. On the recording medium 20 schematically a cut path 22 is drawn with dashed lines to indicate that the recording medium is not yet cut. The width W of the cut path is exaggerated for convenience reasons. A piece 24 of the recording medium 20 is intended to be cut out of a jig 25. The jig 25 is a remainder of the recording medium 20 when the piece 24 of the recording medium is removed. The piece 24 has a shape of a rectangle which has two axes of symmetry indicated with dashed lines 26, 28. Other shapes with more than one symmetry axis may be envisioned to be cut, for example an ellipse, a circle, a polygon, etc.

Also bridges 21, 23 are specified to be parts of the cut path at which no cutting takes place.

Figure 3B:
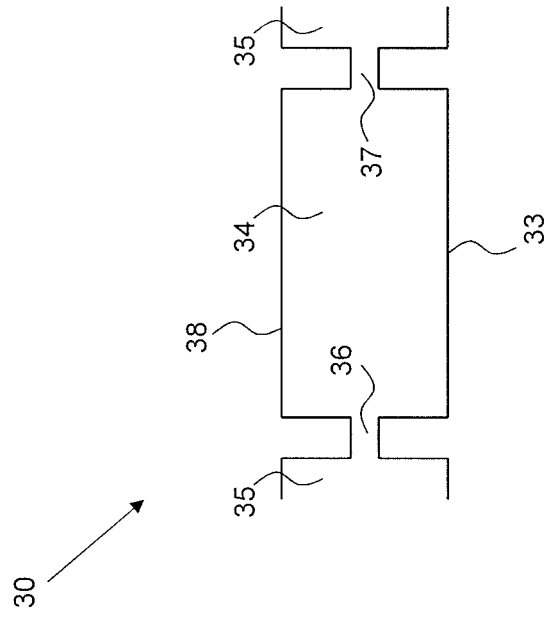
FIG. 3B is a schematic cross cut view of a recording medium with partial bridges according to the invention.
Figure 3A:
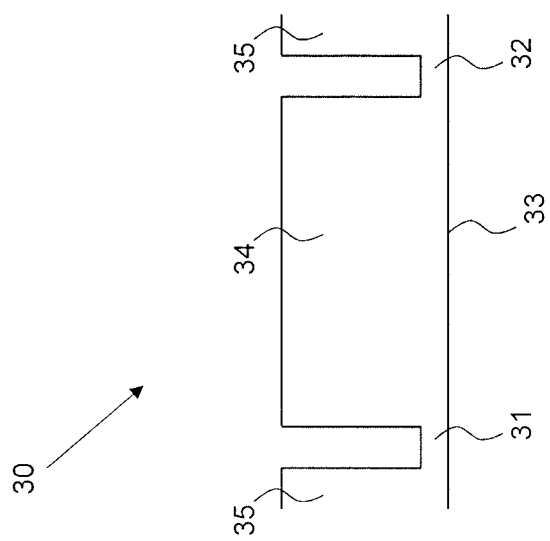
FIG. 3A is a schematic cross cut view of a recording medium with regular bridges according to the prior art.

FIG. 3A schematically illustrates a cross cut view of a recording medium 30 with regular bridges 31, 32 according to the prior art. Since the bridges 31, 32 are adjacent to a printed side 33 of the recording medium 30 the printed image on the printed side 33 of a piece 34 of the recording medium between the bridges 31, 32 will be damaged when breaking the bridges 31, 32 in order to remove the piece 34 of the recording medium 20 from a jig 35.

FIG. 3B schematically illustrates a side view of the recording medium 30 with partial bridges 36, 37 according to the present invention. Since the partial bridges 36, 37 are not adjacent to a printed side 33 of the recording medium 30 and not adjacent to a printed side 38 of the recording medium 30, the printed images on both sides 33, 38 of the piece 34 of the recording medium 30 will not be damaged when breaking the bridges 36, 37 in order to remove the piece 34 of the recording medium 30 from the jig 35.

Figure 4:
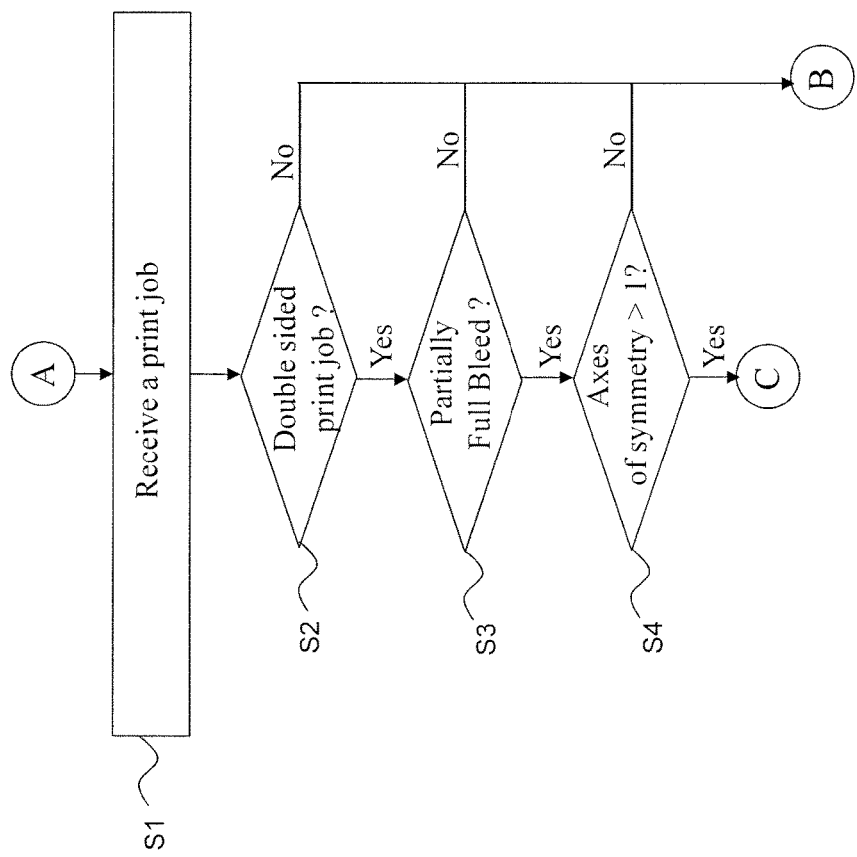
FIGS. 4-5 is a flow diagram of an embodiment of a method of operation of the flatbed cutter assembly according to the present invention.
Figure 5:
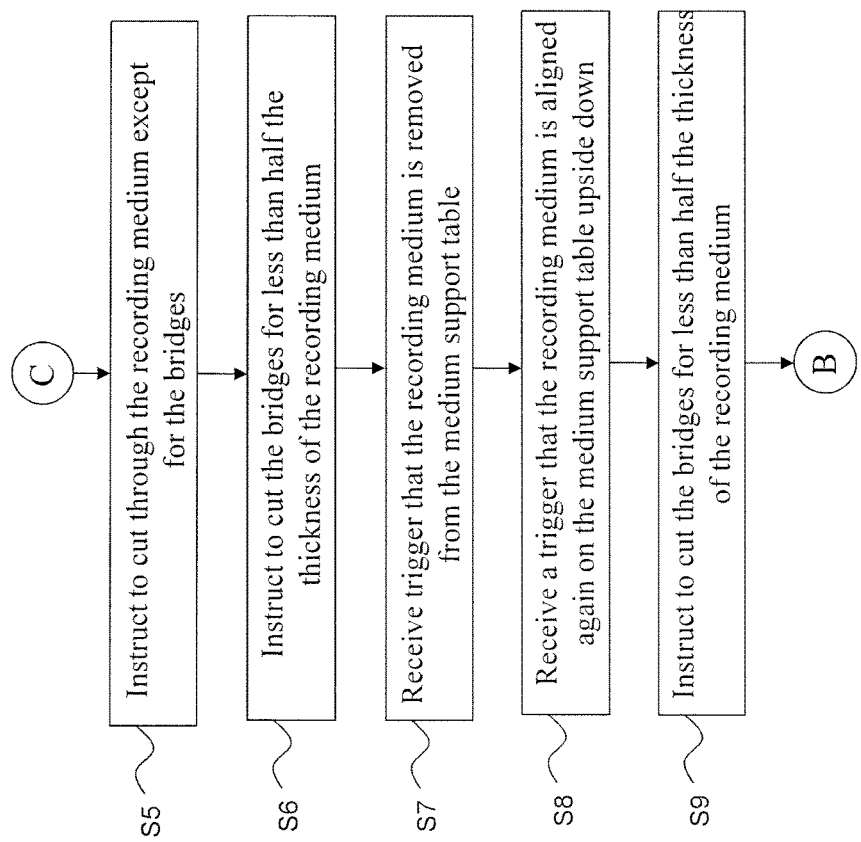

FIG. 4 and FIG. 5 show a flow diagram of an embodiment of the method according to the invention by means of the flatbed cutter assembly 14 of FIG. 1.

The method starts in a starting point A. From the starting point A the method proceeds to a first step S1.

In the first step S1 a print job is received by the controller of the flatbed cutter assembly 14. The print job includes a cut path intended to circumvent a piece of the recording medium which is intended to be cut out of the recording medium. The cut path may also be entered via the user interface of the flatbed cutter assembly.

In a second step S2 it is determined whether or not the print job specifies that images are intended to be printed on a front side and on a back side of the recording medium. Such a print job may be specified as a two-sided print job or a double-sided print job.

In a third step S3 it is determined whether or not the print job specifies that the images are intended to be printed at least partially full bleed with respect to the cut path. In case of full bleed printing, marking material intended to be ejected on or adhered to a side of the piece of recording medium, touches at least a part of an edge of the piece of recording medium when cut out. Such a print job may be specified to be printed in a full bleed print mode or part of the images intended to be printed on the piece of recording medium may be beyond the piece of recording medium intended to be circumvented by the specified cut path.

Full bleed printing is also called printing from edge to edge.

In a fourth step S4 it is determined whether or not the circumvented piece of recording medium has at least two axes of symmetry. When no or one axis of symmetry is involved the present invention is not suitable since there is no need for the present invention is to be applied by the operator.

In one of the determination in the steps S2-S4 is negative, the method proceeds to the end point B. If so, the method proceeds to a fifth step S5 via an intermediate point C in FIG. 4 and FIG. 5. According to the method of the invention the fifth step S5 and the following steps may also be applied without any positive determination in the steps S2-S4. Moreover, according to another embodiment the steps S1-S4 are skipped and only the fifth step S5 and the following steps are executed.

In the fifth step S5 the cutter is instructed by the controller to cut through the recording medium from a front side to a back side along the cut path except for a plurality of locations of bridges along the cut path. The bridges will get a form of a partial or half bridge according to the invention as shown in FIG. 3B. The following steps provide an embodiment of how to create the half or partial bridges by the cutter.

In a sixth step S6 the cutter is instructed by the controller to cut the recording medium for less than half a thickness of the recording medium from the front side towards the back side at the locations of the bridges along the cut path.

In a seventh step S7 a trigger is received by the controller that the recording medium is removed from the medium support table as to be turned upside down. Such a trigger may be derived from signals from sensor integrated in the flat bed surface.

In an eighth step S8 a trigger is received by the controller that the recording medium is aligned again on the medium support table.

In a ninth step S9 the cutter is instructed by the controller to cut the recording medium for less than half the thickness of the recording medium from the back side towards the front side at the locations of the bridges along the cut path.

By cutting the recording medium at both sides for less than half the thickness of the recording medium a bridge will stay present at the planned location for the bridge. This is also advantageous since the cutting depth is the same for the front and back side with respect to the locations of the bridges and the cutting depth needs only to be set once.

According to another embodiment the cutting depth on the front side is different from the cutting depth on the back side and a sum of the cutting depths is smaller than the thickness of the recording medium minus a minimum sufficient and necessary thickness of the bridge. Both cutting depths are assumed to be larger than a zero distance.

The method ends in an endpoint B.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A flatbed cutter assembly, the flatbed cutter assembly comprising:
   a medium support table for supporting a recording medium, the table extending in a first direction and a second direction, the first direction being perpendicular to the second direction;
   a gantry arranged to be moveable over the medium support table in the first direction;
   a carriage support movably arranged on the gantry to move over the medium support table in the second direction;
   a cutter configured to be coupled to the carriage support and comprising an actuator to control a cutting depth; and
   a controller for controlling the movements of the gantry, the carriage support and the cutter while moving over the medium support table,
   wherein the controller is configured to:
   a) instruct the cutter to cut through the recording medium from a front side to a back side along a cut path except for a plurality of locations of bridges along the cut path;
   b) instruct the cutter to cut the recording medium for less than half the thickness of the recording medium from the front side towards the back side at the locations of the bridges along the cut path;
   c) receive a trigger that the recording medium is removed from the medium support table as to be turned upside down;
   d) receive a trigger that the recording medium is aligned again on the medium support table; and
   e) instruct the cutter to cut the recording medium for less than half the thickness of the recording medium from the back side towards the front side at the locations of the bridges along the cut path.

2. The flatbed cutter assembly according to claim 1, wherein the controller is configured to:
   i) receive a print job including a cut path intended to circumvent a piece of the recording medium;
   ii) determine whether or not the print job specifies that images are intended to be printed on a front side and on a back side of the recording medium;
   iii) determine whether or not the print job specifies that the images are intended to be printed at least partially full bleed with respect to the cut path;
   iv) determine whether or not the circumvented piece of recording medium has at least two axes of symmetry; and
   v) upon a positive determination of ii), iii) and iv), applying the steps a)-e).

3. The flatbed cutter assembly according to claim 2, further comprising a user interface, and
   wherein the controller is configured to request permission to execute step v) by means of user interaction via the user interface.

4. A method for cutting a recording medium by a flatbed cutter assembly, the flatbed cutter assembly comprising a medium support table for supporting a recording medium, the table extending in a first direction and a second direction, the first direction being perpendicular to the second direction, a gantry arranged to be moveable over the medium support table in the first direction, a carriage support movably arranged on the gantry to move over the medium support table in the second direction, a cutter configured to be coupled to the carriage support and comprising an actuator to control a cutting depth, and a controller for controlling the movements of the gantry, the carriage support and the cutter while moving over the medium support table,
   wherein the method comprises the steps of:
   a) instructing the cutter to cut through the recording medium from a front side to a back side along the cut path except for a plurality of locations of bridges along the cut path;
   b) instructing the cutter to cut the recording medium for less than half the thickness of the recording medium from the front side towards the back side at the locations of the bridges along the cut path;
   c) receiving a trigger that the recording medium is removed from the medium support table as to be turned upside down;
   d) receiving a trigger that the recording medium is aligned again on the medium support table; and
   e) instructing the cutter to cut the recording medium for less than half the thickness of the recording medium from the back side towards the front side at the locations of the bridges along the cut path.

5. The method according to claim 4, wherein the method comprises the steps of:
   i) receiving a print job including a cut path intended to circumvent a piece of the recording medium;

ii) determining whether or not the print job specifies that images are intended to be printed on a front side and on a back side of the recording medium;
iii) determining whether or not the print job specifies that the images are intended to be printed at least partially full bleed with respect to the cut path;
iv) determining whether or not the circumvented piece of recording medium has at least two axes of symmetry; and
v) upon a positive determination of ii), iii) and iv), applying the steps a)-e).

6. Computer-program A computer-program product embodied on a non-transitory computer readable medium and configured to execute the method according to claim 4 when executed on a processor.

* * * * *